United States Patent
Matsuda et al.

(10) Patent No.: US 8,363,026 B2
(45) Date of Patent: Jan. 29, 2013

(54) INFORMATION PROCESSOR, INFORMATION PROCESSING METHOD, AND COMPUTER PROGRAM PRODUCT

(75) Inventors: Kyohei Matsuda, Oume (JP); Yoji Nagao, Oume (JP); Yukihiro Suda, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/041,308

(22) Filed: Mar. 4, 2011

(65) Prior Publication Data

US 2012/0001858 A1   Jan. 5, 2012

(30) Foreign Application Priority Data

Jun. 30, 2010 (JP) ................. 2010-150462

(51) Int. Cl.
*G06F 3/041* (2006.01)
(52) U.S. Cl. .......... 345/173; 345/156; 715/810
(58) Field of Classification Search .......... 345/156–179; 178/18.01–18.09, 18.11; 715/810, 831
See application file for complete search history.

(56) References Cited

U.S. PATENT DOCUMENTS

| | | | | |
|---|---|---|---|---|
| 7,834,861 B2* | 11/2010 | Lee | ................. | 345/173 |
| 2004/0095395 A1* | 5/2004 | Kurtenbach | ................. | 345/810 |
| 2005/0204301 A1* | 9/2005 | Keely et al. | ................. | 715/768 |
| 2008/0094356 A1 | 4/2008 | Ording et al. | | |
| 2011/0004821 A1* | 1/2011 | Miyazawa et al. | ............ | 715/702 |
| 2011/0285665 A1* | 11/2011 | Matsumoto | ................. | 345/174 |

FOREIGN PATENT DOCUMENTS

| | | |
|---|---|---|
| JP | H02-139620 | 5/1990 |
| JP | H02-268317 | 11/1990 |
| JP | H06-019612 | 1/1994 |
| JP | 2010-503125 A | 1/2010 |
| JP | 2011-107823 | 6/2011 |
| WO | WO 2008/030880 A1 | 3/2008 |

OTHER PUBLICATIONS

Notice of Rejection mailed by the Japan Patent Office on Jul. 19, 2011 in the corresponding Japanese patent app. No. 2010-150462 in 4 pages.

Decision to Grant a Patent mailed by the Japan Patent Office on Oct. 18, 2011 in the corresponding Japanese patent app. No. 2010-150462 in 4 pages.

* cited by examiner

*Primary Examiner* — Stephen Sherman (74) *Attorney, Agent, or Firm* — Knobbe, Martens, Olson & Bear LLP (57) ABSTRACT

According to one embodiment, an information processor includes a touch point sensor, a direction sensor, and a display controller. The touch point sensor detects a touch point of a finger that touches a touch panel of a display device. The direction sensor detects a direction that the finger points. The display controller provides a pop-up display on the display device at a position on at least one straight line perpendicular to a straight line passing on the touch point in parallel to the direction that the finger points. The position is separated from a cross point of the straight lines by a predetermined distance.

20 Claims, 10 Drawing Sheets

--Prior Art--

FIG.4

--Prior Art--

INFORMATION PROCESSOR, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2010-150462, filed Jun. 30, 2010, the entire contents of which are incorporated herein by reference.

FIELD

Embodiments described herein relate generally to an information processor, an information processing method, and a computer program product.

BACKGROUND

There has been widespread use of personal computers (PCs) and portable electronic devices provided with a liquid crystal display (LCD) having a touch panel on the surface. Such an electronic device enables intuitive operation in connection with the display, which increases the users and the usage thereof.

Various technologies have been proposed to improve the operability for touch input on an electronic device with a touch panel. For example, there is disclosed a technology to detect a touch point from a contact area between a finger and the touch panel. There is disclosed another technology to facilitate the operation to select a selection button displayed on the screen based on the distance between a touch point and the selection button.

Generally, when the mouse cursor is moved to an icon displayed on the screen, a file name, file content, and the like are displayed in a pop-up manner. Such a pop-up display is displayed near the display position of the icon. Since the display area of the cursor is small enough, the pop-up display is not hidden by the cursor.

On the other hand, when the user performs a touch operation, his/her finger or hand is brought near the screen. As a result, the pop-up display is hidden by the finger or hand if arranged in a conventional manner.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments will be described hereinafter with reference to the accompanying drawings. In general, according to one embodiment, an information processor comprises a touch point sensor, a direction sensor, and a display controller. The touch point sensor is configured to detect a touch point of a finger that touches a touch panel of a display device. The direction sensor is configured to detect a direction that the finger points. The display controller is configured to provide a pop-up display on the display device at a position on at least one straight line perpendicular to a straight line passing on the touch point in parallel to the direction that the finger points. The position is separated from a cross point of the straight lines by a predetermined distance.

According to another embodiment, there is provided an information processing method comprising: detecting, by a touch point sensor, a touch point of a finger that touches a touch panel of a display device; detecting, by a direction sensor, a direction that the finger points; and providing, by a display controller, a pop-up display on the display device at a position on at least one straight line perpendicular to a straight line passing on the touch point in parallel to the direction that the finger points, the position being separated from a cross point of the straight lines by a predetermined distance.

According to still another embodiment, a computer program product comprises a computer-readable storage medium having computer readable program codes embodied in the medium that, when executed, causes a computer to implement the above information processor.

Figure 1:
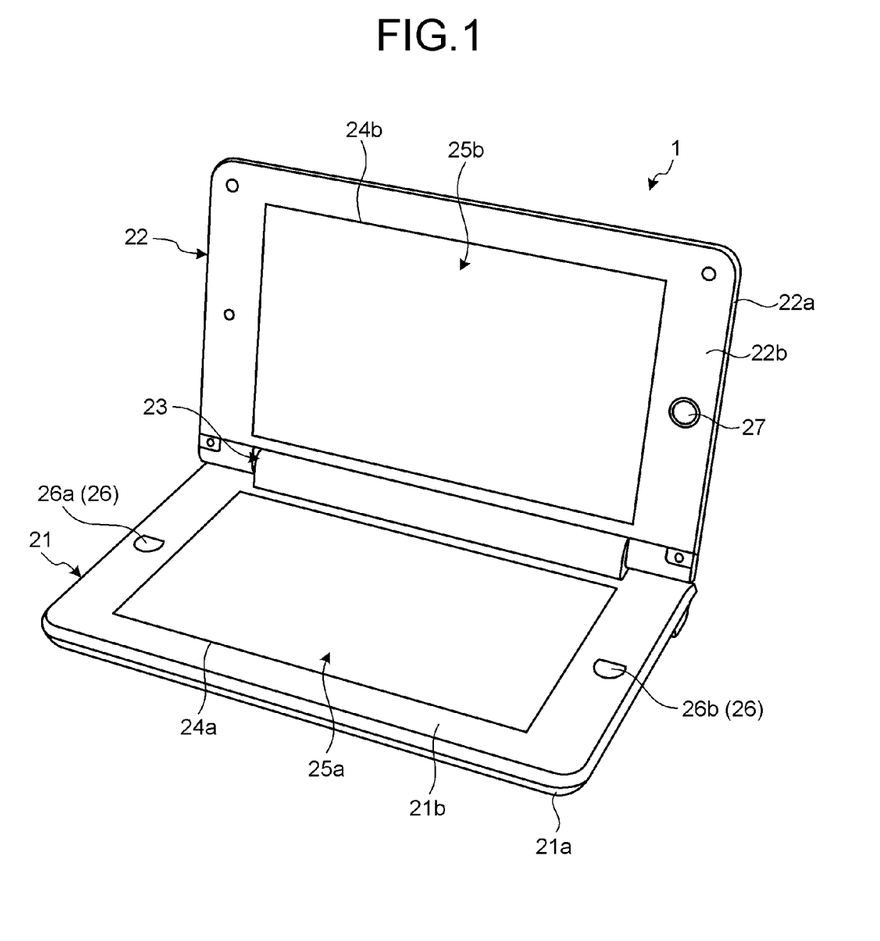
FIG. 1 is an exemplary external perspective view of an information processor according to a first embodiment.

FIG. 1 is an external perspective view of an information processor 1 according to a first embodiment. The information processor 1 of the first embodiment is, for example, a notebook personal computer. As illustrated in FIG. 1, the information processor 1 comprises a flat rectangular first body 21 and a flat rectangular second body 22. The first body 21 and the second body 22 are connected via a joint 23 to be relatively rotatable.

The first body 21 is provided with a display panel 24a such as a liquid crystal display (LCD) panel, push buttons 26 (26a and 26b), and the like on a front surface 21b of a housing 21a. The front surface 21b is hidden inside when the first body 21 and the second body 22 are rotated through the joint 23 to the closed position. The display panel 24a is provided with a touch panel 25a on the surface.

Meanwhile, the second body 22 is provided with a display panel 24b such as an LCD panel, a push button 27, and the like on a front surface 22b of a housing 22a. The front surface 22b is hidden inside when the first body 21 and the second body 22 are rotated through the joint 23 to the closed position. The display panel 24b is provided with a touch panel 25b on the surface.

Figure 2:
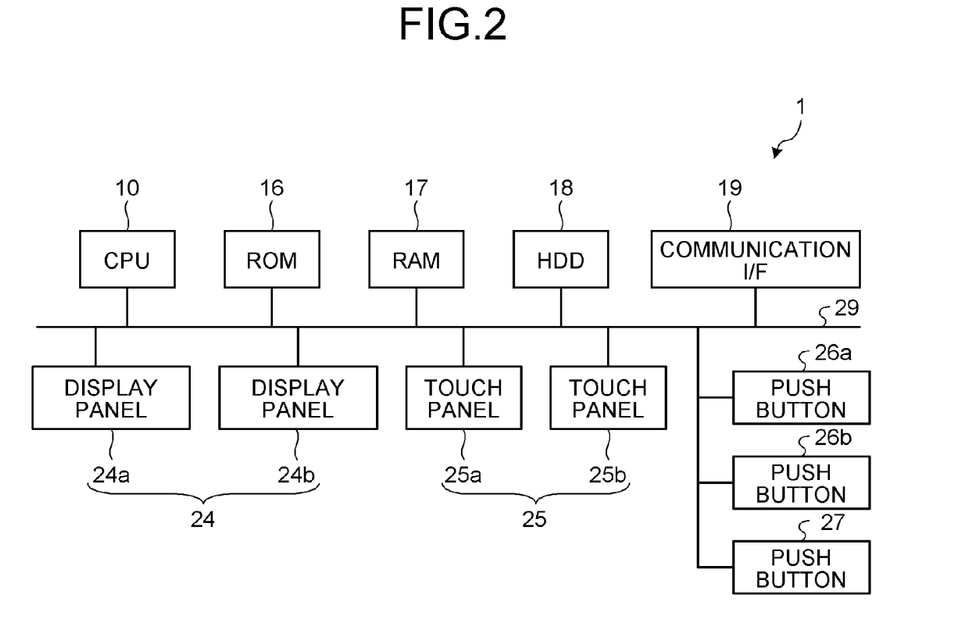
FIG. 2 is an exemplary block diagram of a hardware configuration of the information processor in the first embodiment.

A hardware configuration of the information processor 1 will be described. FIG. 2 is a block diagram of a hardware configuration of the information processor 1.

As illustrated in FIG. 2, the information processor 1 comprises a central processing unit (CPU) 10, a read only memory (ROM) 16, a random access memory (RAM) 17, a hard disk drive (HDD) 18 as a storage device, a communication interface (I/F) 19, the display panels 24 (24a and 24b), the touch panels 25 (25a and 25b), and the push buttons 26a, 26b, and 27, which are connected by a bus 29. That is, the information processor 1 has a common hardware configuration using a computer.

The ROM 16 stores a program of the first embodiment, various types of programs, various types of setting data, and the like. The RAM 17 temporarily stores a program and data when the CPU 10 executes the program. The CPU 10 loads the program of the first embodiment from the ROM 16 into the RAM 17 and executes it, thereby functioning as a controller. The communication I/F 19 controls data communication with other information processors and the like via a local area network (LAN), the Internet, or the like.

The display panel 24 (24a, 24b) displays various types of screens under the control of the CPU 10. More specifically, a control circuit formed of electronic components and the like is mounted on a circuit board inside the housings 21a and 22a. The display panel 24 (24a, 24b) receives a display signal from the CPU 10 and displays a video image including a moving image and a still image.

The touch panel 25 (25a, 25b) may be a common capacitive or pressure-sensitive touch panel. The touch panel 25 (25a, 25b) detects touch thereon with an object such as a finger, and sends positional information of the contact area of the object to the CPU 10. A position on each of the touch panels 25 is associated with a position on corresponding one of the display panels 24 so that the positions match.

Figure 3:
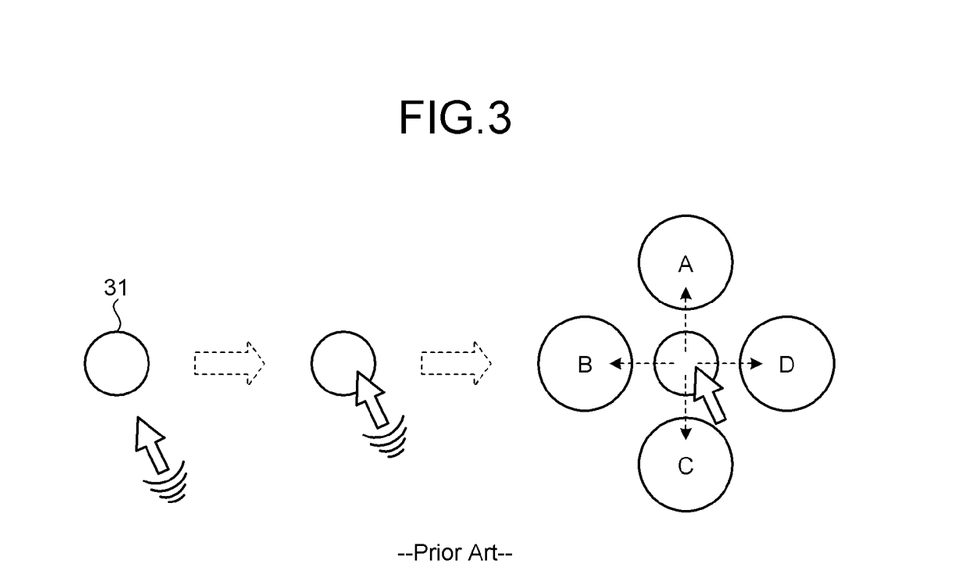
FIG. 3 is an exemplary schematic diagram for explaining a pop-up display when mouse input is provided according to a conventional display method.
Figure 4:
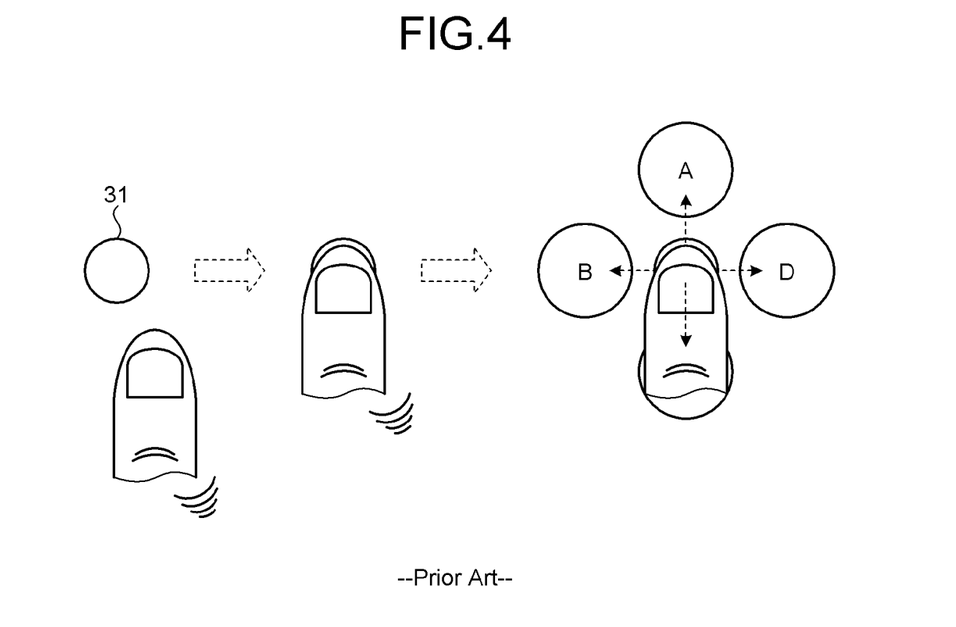
FIG. 4 is an exemplary schematic diagram for explaining a pop-up display when touch input is provided according to the conventional display method.

With reference to FIGS. 3 and 4, a description will be given of a pop-up display according to a conventional display method. FIGS. 3 and 4 each illustrate an example of a pop-up display when mouse input or touch input is provided according to the conventional display method. As illustrated in FIG. 3, when a cursor is moved onto an icon with an input device such as a mouse or the like, a pop-up display is not covered by the cursor since the display area of the cursor is small. Accordingly, there is no need to take into account the display position and arrangement of the pop-up display.

On the other hand, when input is provided by touching the touch panel with a finger, it is necessary to take into account the position of a pop-up display. That is, as illustrates in FIG. 4, in the case of touch input, a pop-up display C is hidden under a finger and is difficult to see. Besides, to select a pop-up display A or the pop-up display C, the user have to stretch or bend his/her finger or hand, which makes it difficult to select the display.

In view of this, the information processor 1 of the first embodiment displays a pop-up display at a position easily viewed by the user when touch input is provided.

Figure 5:
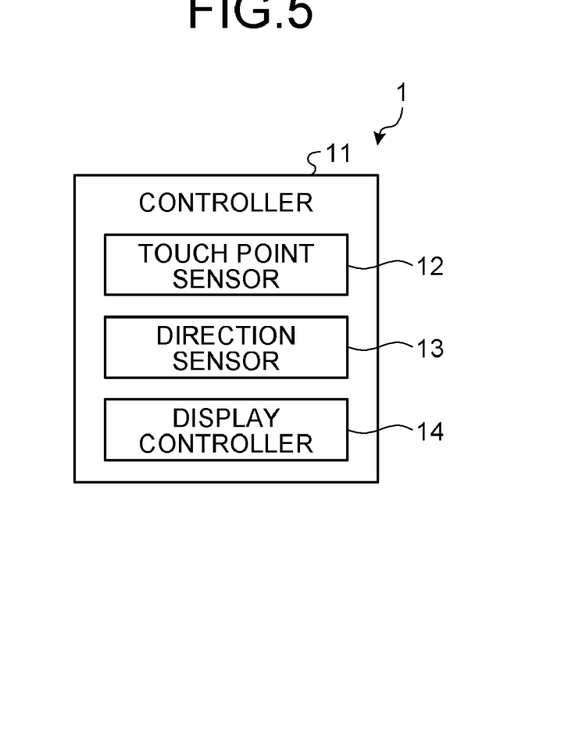
FIG. 5 is an exemplary functional block diagram of the information processor in the first embodiment.

In the following, a description will be given of a functional configuration of the information processor 1. FIG. 5 is a functional block diagram of the information processor 1. In the information processor 1, the CPU 10 loads the program of the first embodiment from the ROM 16 into a main storage device and executes it, thereby implementing a controller 11 on the main storage device. As illustrated in FIG. 5, the controller 11 comprises a touch point sensor 12, a direction sensor 13, and a display controller 14.

The touch point sensor 12 detects a touch point P from a contact area of a finger placed on the touch panel 25.

The direction sensor 13 detects a direction Q that the finger placed on the touch panel 25 points.

There have been proposed various conventional methods to detect the touch point P or the direction Q that the finger points. In the first embodiment, the detection method is not specifically limited, and any of the conventional methods may be used. An example will be described with reference to FIG. 6.

Figure 6:
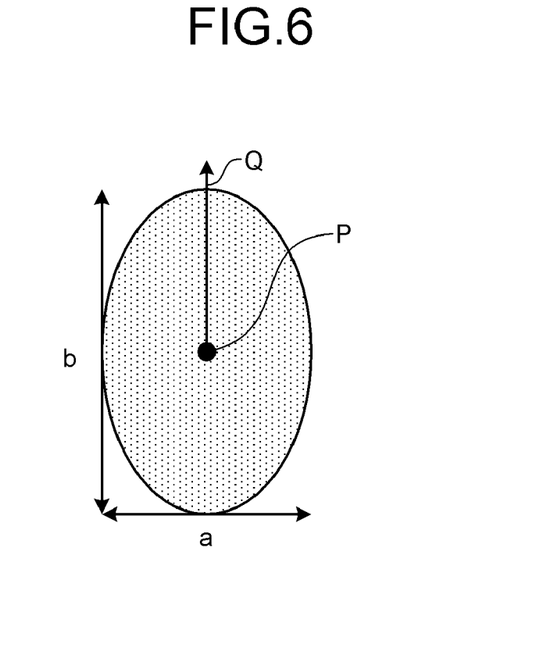
FIG. 6 is an exemplary schematic diagram of a contact area of a finger on a touch panel in the first embodiment.

FIG. 6 is a schematic diagram of a contact area of a finger on the touch panel 25. As illustrated in FIG. 6, if the contact area of the finger on the touch panel 25 is ellipse in shape, the touch point sensor 12 detects the center point of the contact area, i.e., the center of a major axis b and a minor axis a, as the touch point P.

The direction sensor 13 detects directions in which the major axis b and the minor axis a of the ellipse extend. The direction sensor 13 detects a direction parallel to the direction in which the major axis b extends from the touch point P as the origin as the direction Q that the finger points.

If the touch panel 25 is, for example, a pressure-sensitive touch panel, the touch point sensor 12 may detect a point where the maximum pressure is exerted as the touch point P. The direction sensor 13 may detect the direction Q that the finger points from the pressure distribution of the contact area.

The display controller 14 displays, when the CPU 10 executes one of the programs stored in the ROM 16, a display screen 30 (see FIG. 7) of a corresponding application and the like on the display panel 24 (24a, 24b).

Figure 7:
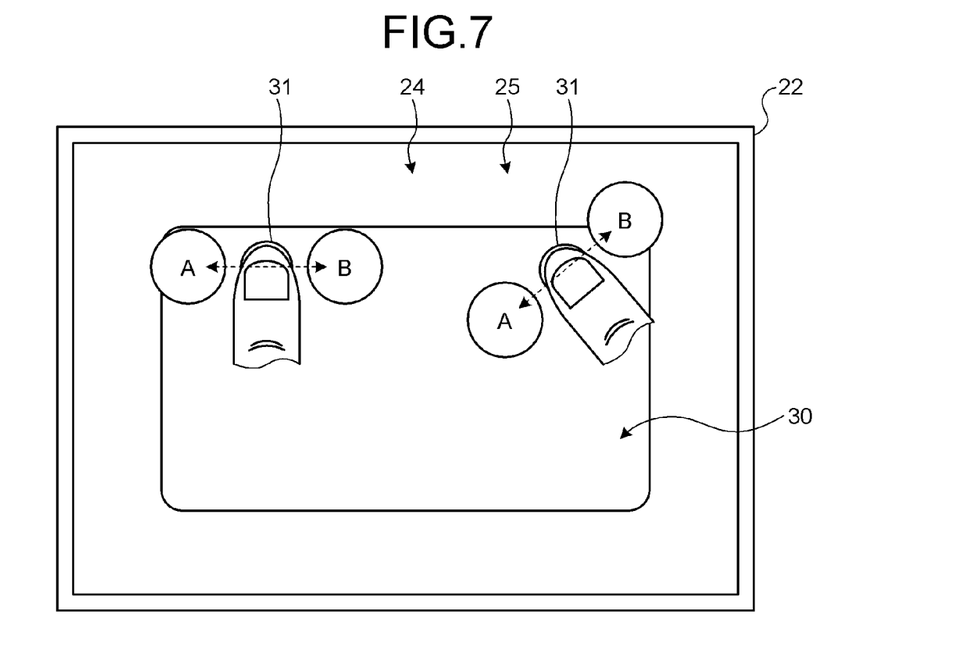
FIGS. 7 and 8 are exemplary schematic diagrams for explaining a pop-up display in the first embodiment.
Figure 8:
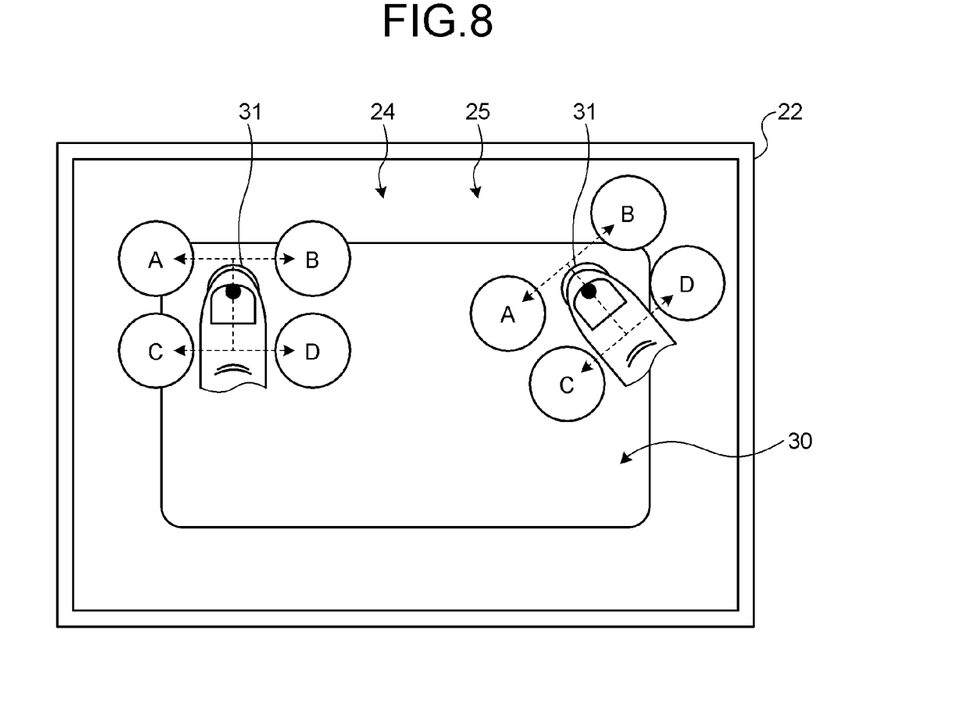

FIGS. 7 and 8 illustrate examples of pop-up displays in the first embodiment. As illustrated in FIGS. 7 and 8, when the user touches the icon of an application, a display button 31, or an area around it, the display controller 14 displays a pop-up display related to the application being executed around the touch point P. Examples of the pop-up display include display of file content, input support, and menu of operational options. The display controller 14 displays one or more pop-up displays on the display panel 24 according to the application and the display content.

Figure 9:
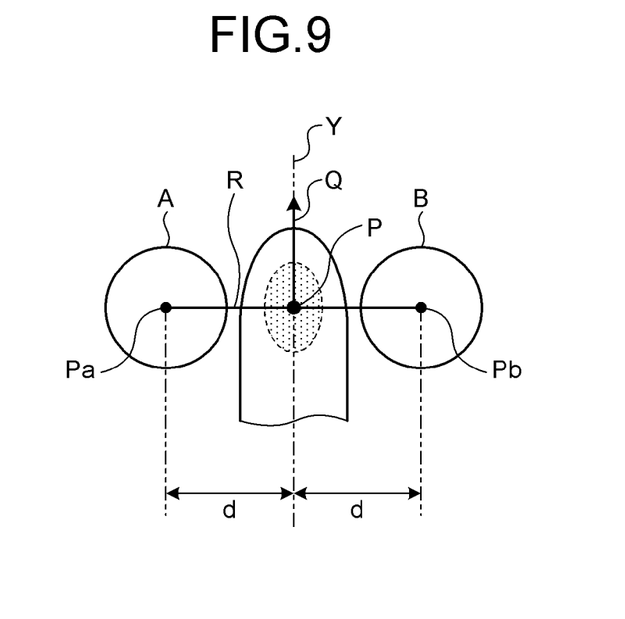
FIG. 9 is an exemplary schematic diagram for explaining display positions of two pop-up displays in the first embodiment.
Figure 10:
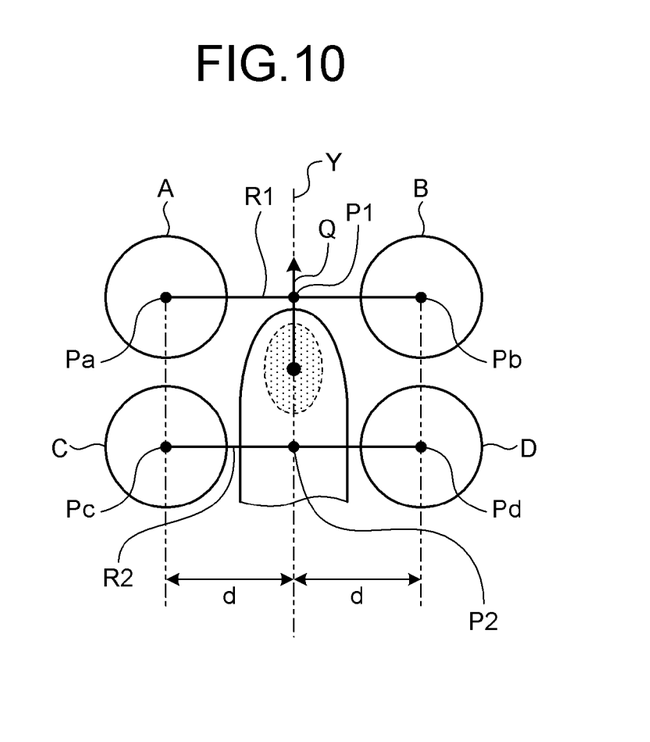
FIG. 10 is an exemplary schematic diagram for explaining display positions of four pop-up displays in the first embodiment.

With reference to FIGS. 9 and 10, a description will be given of display positions of pop-up displays displayed by the display controller 14.

FIG. 9 illustrates display positions of two pop-up displays. In FIG. 9, a straight line Y passes on the touch point P in parallel to the direction Q that a finger points. The display controller 14 displays pop-up displays A and B at positions on a straight line R perpendicular to the straight line Y, separated from the touch point P by a predetermined distance d. The predetermined distance d is preferably a distance that can be reached from the touch point P by the finger without strain on the finger. The touch point P corresponds to the cross point of the straight lines Y and R.

Upon providing two pop-up displays, as illustrated in FIG. 9, the display controller 14 arranges the pop-up displays A and B on both sides of the finger, respectively, with the touch point P as the center. That is, the display controller 14 arranges the pop-up displays A and B on the straight line R such that center points Pa and Pb of the pop-up displays A and B are separated from the touch point P by the predetermined distance d on both the left and right sides of the touch point P, respectively.

FIG. 10 illustrates display positions of four pop-up displays. As illustrated in FIG. 10, upon providing four pop-up displays, the display controller 14 arranges the pop-up displays A, B, C, and D, two on each side of the finger, with the touch point P as the center.

More specifically, the display controller 14 arranges the pop-up displays A and B such that the center points Pa and Pb of the pop-up displays A and B are located on a straight line R1 and separated from a cross point P1 of the straight lines Y and R1 by the predetermined distance d on both the left and right sides of the point P1, respectively. Similarly, the display controller 14 arranges pop-up displays C and D such that center points Pc and Pd of the pop-up displays C and D are located on a straight line R2 and separated from a cross point P2 of the straight lines Y and R2 by the predetermined distance d on both the left and right sides of the point P2, respectively.

Figure 11:
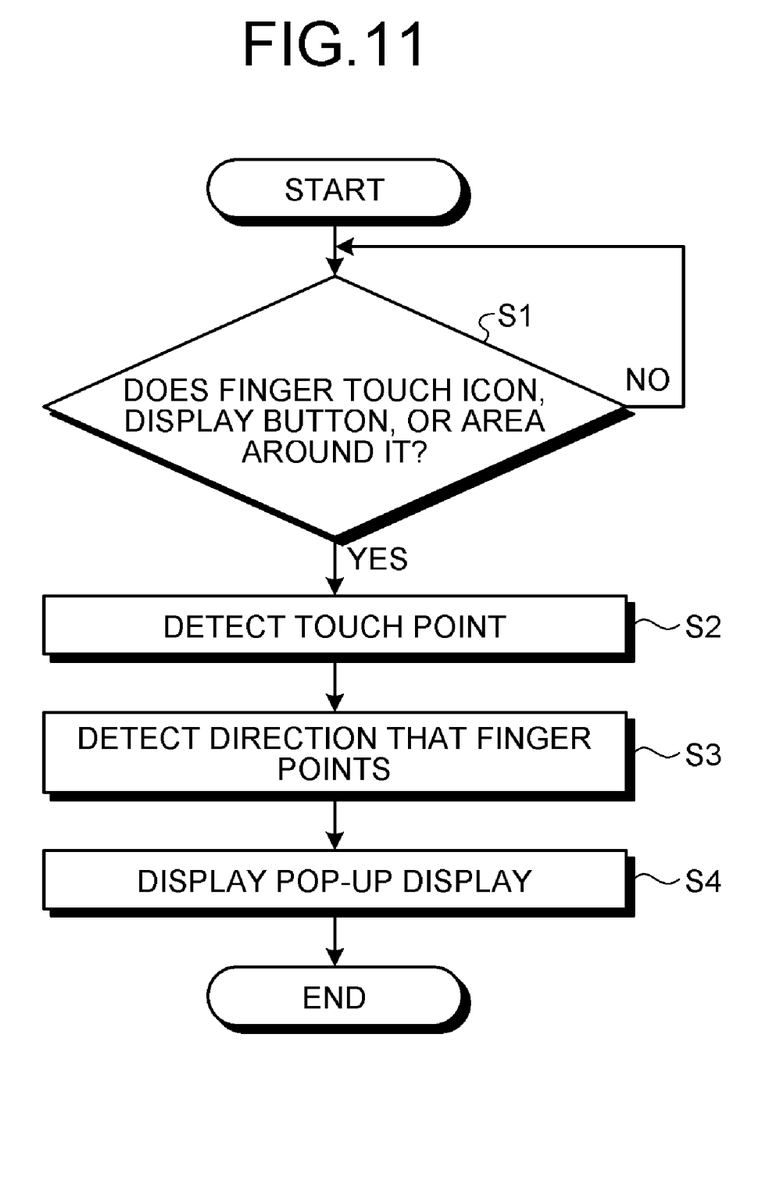
FIG. 11 is an exemplary flowchart of the operation of the information processor to display a pop-up display in the first embodiment.

In the following, a description will be given of the operation of the information processor 1 to display a pop-up display. FIG. 11 is a flowchart of the operation of the information processor 1 to display a pop-up display.

First, the display controller 14 determines whether a finger touches the icon of an application, the display button 31, or an area around it (S1). If not (No at S1), the process of S1 is repeated until touch input is detected.

On the other hand, if a finger touches an area around the display button 31 or the like (Yes at S1), the touch point sensor 12 detects the touch point P from the contact area of the finger placed on the touch panel 25 (S2). The direction sensor 13 detects the direction Q that the finger placed on the touch panel 25 points (S3).

The display controller 14 displays a pop-up display at a position on the straight line R perpendicular to the direction Q that the finger points, separated from the touch point P by the predetermined distance d (S4).

As described above, according to the first embodiment, the information processor 1 displays pop-up displays (A, B, C, and D) at positions on the straight line R perpendicular to the direction Q that a finger points on the display panel 24. With this, the pop-up displays are displayed not to be hidden by the finger. Thus, the pop-up displays can be provided at the positions easily viewed by the user when touch input is provided on the touch panel 25.

Moreover, since the pop-up displays are displayed on the straight line R perpendicular to the direction Q that a finger points, the user can select a pop-up display by moving his/her finger in the horizontal direction (the direction in which the straight line R extends) without moving the finger in the vertical direction (the direction Q that the finger points or the opposite direction thereto). This allows the user to easily select a pop-up display.

Incidentally, the direction sensor 13 need not necessarily be able to specify the direction Q that a finger points as long as it can detect a direction parallel to the direction of the finger. That is, the information processor 1 provides a pop-up display on the straight line R parallel to the minor axis a of an ellipse and does not provide a pop-up display to a position in the direction of the major axis b of the ellipse which may be hidden by the finger. Thus, even if the direction Q that a finger points cannot be specified, a pop-up display is not to be provided to a position which may be hidden by the finger.

While the information processor 1 is described above as a notebook personal computer, it is not limited thereto and may be any other electronic device such as, for example, a portable electronic device provided with the above functions.

The touch panel 25 may support multi-touch functions. In this case, the information processor 1 detects the touch point P and the direction Q that a finger points with respect to each of contact areas, and provides a pop-up display with respect to each of the touch points P.

Figure 12:
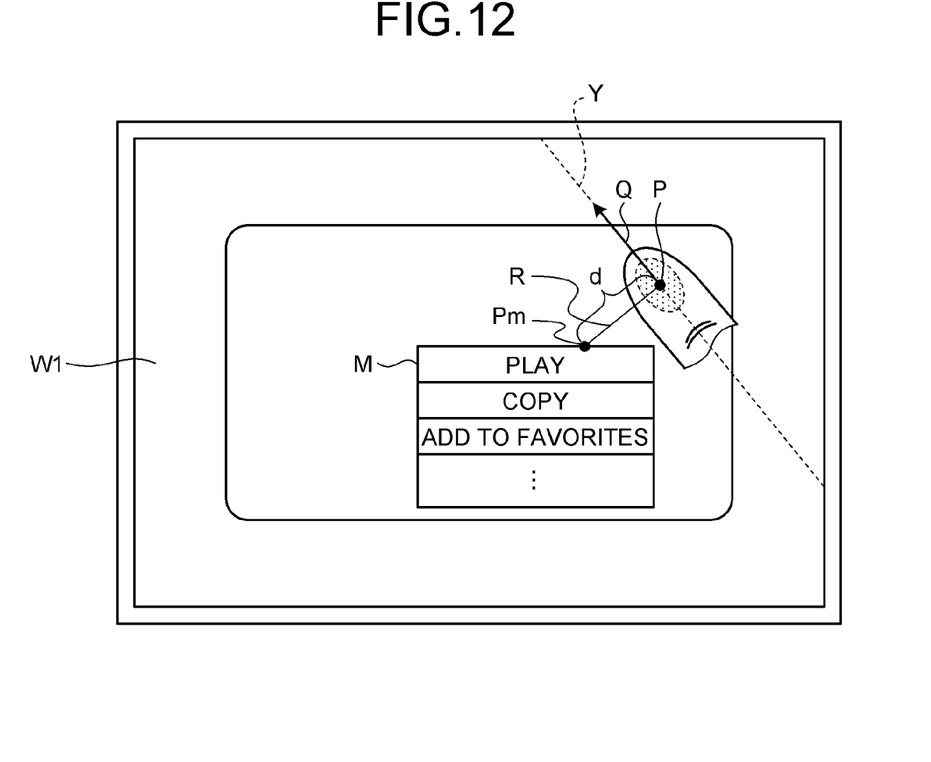
FIG. 12 is an exemplary schematic diagram of a menu display according to a second embodiment.

FIG. 12 is a schematic diagram of a menu display according to a second embodiment. In the second embodiment, as illustrated in FIG. 12, a menu M of available options is displayed in a pop-up manner.

Figure 13:
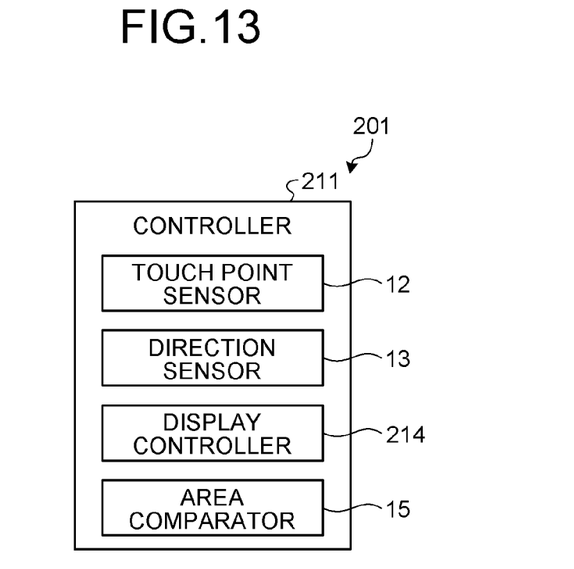
FIG. 13 is an exemplary functional block diagram of an information processor in the second embodiment.

FIG. 13 is a functional block diagram of an information processor 201 of the second embodiment. In the information processor 201, the CPU 10 loads a program of the second embodiment from the ROM 16 into the main storage device and executes it, thereby implementing a controller 211 on the main storage device. As illustrated in FIG. 13, the controller 211 comprises the touch point sensor 12, the direction sensor 13, a display controller 214, and an area comparator 15. Like elements are designated by like reference numerals, and their description will not be repeated.

Figure 14:
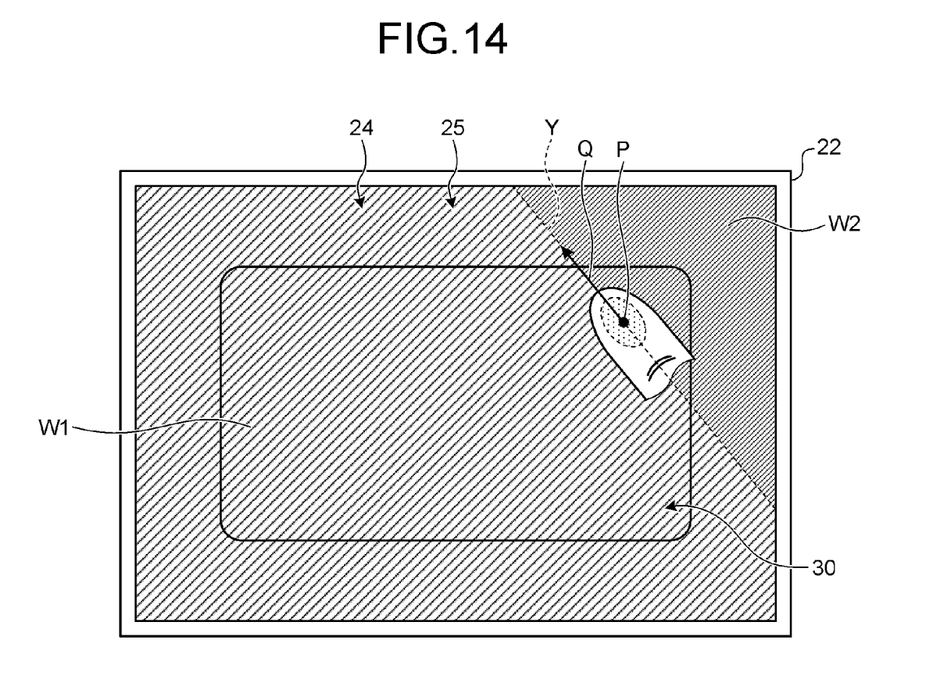
FIG. 14 is an exemplary schematic diagram for explaining a display area in the second embodiment.

As illustrated in FIG. 14, the area comparator 15 divides the display area of the display panel 24 into a left area W1 and a right area W2 by the straight line Y that passes on the touch point P in parallel to the direction Q that a finger points. The area comparator 15 then compares the left area W1 and the right area W2, and selects one of them that is wider in area than the other.

In the example of FIG. 14, the left area W1 obtained by dividing the display area by the straight line Y is wider in area than the right area W2. Accordingly, the area comparator 15 selects the left area W1 as an area where a pop-up display is to be provided.

The display controller 214 displays the menu M in the wider area (the left area W1 or the right area W2) selected by the area comparator 15. More specifically, as illustrated in FIG. 12, the display controller 214 displays the menu M in the left area W1 such that a center point Pm of the upper side of the menu M is on the straight line R perpendicular to the direction Q that the finger points and is separated from the touch point P by the predetermined distance d.

Figure 15:
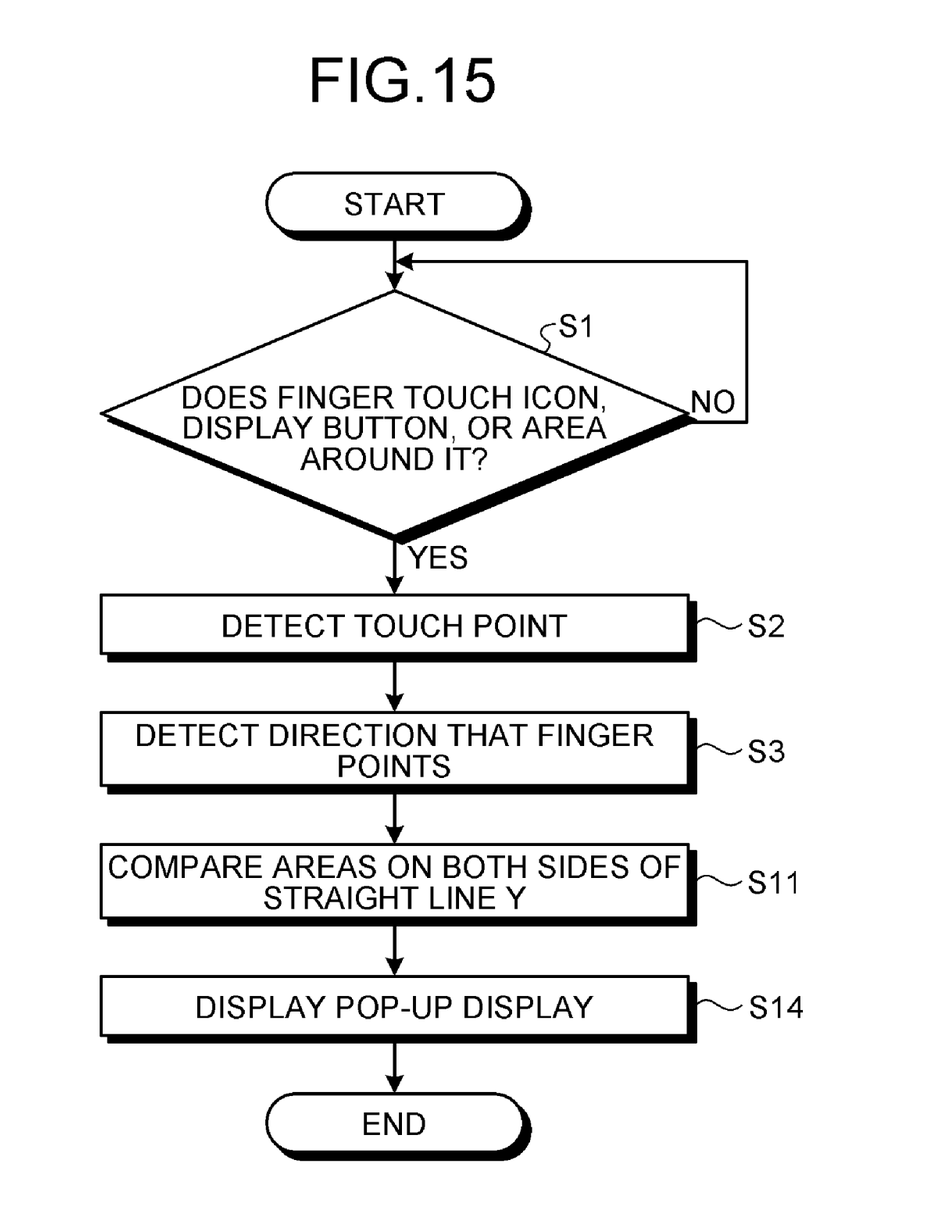
FIG. 15 is an exemplary flowchart of the operation of the information processor to display a pop-up display in the second embodiment.

In the following, a description will be given of the operation of the information processor 201 to display a pop-up display (menu display). FIG. 15 is a flowchart of the operation of the information processor 201 to display a pop-up display (menu display). Incidentally, the same process as previously described in connection with FIG. 11 will not be repeated.

The area comparator 15 compares the left area W1 and the right area W2 obtained by dividing the display area of the display panel 24 by the straight line Y (see FIG. 14), and selects one of them that is wider in area than the other (S11). The display controller 214 then displays the menu M in the area selected at S11 such that the center point Pm of the upper side of the menu M is on the straight line R perpendicular to the direction Q that a finger points and is separated from the touch point P by the predetermined distance d.

As described above, according to the second embodiment, the information processor 201 determines the position of the touch point P on the display panel 24 to provide a pop-up display. Thus, even if the pop-up display requires a wide display area as the menu M, the pop-up display can be provided at a position that can be easily viewed by the user. Besides, the menu M is displayed on the display panel 24 on a wider side of the display area, which facilitates to select an item from the menu M.

According to the first and second embodiments, a pop-up display can be provided at a position easily viewed by the user when touch input is provided on the touch panel. In addition, if the pop-up display is, for example, a selectable button, it can be provided at a position easily selected by the user.

While the direction Q that a finger points is described above as being detected when the finger touches the touch panel 25, it is not so limited. For example, the direction Q that a finger points may be detected when the contact area of the finger that touches the touch panel 25 changes and the direction Q changes, and a pop-up display may be provided on the straight line R perpendicular to the direction Q.

A computer program may be executed on a computer to realize the same function as the information processor 1 (201). The computer program may be provided as being stored in a computer-readable storage medium, such as a compact disc-read only memory (CD-ROM), a flexible disk (FD), a compact disc recordable (CD-R), and a digital versatile disc (DVD), as a file in an installable or executable format.

The computer program may also be stored in a computer connected via a network such as the Internet so that it can be downloaded therefrom via the network. The computer program may also be provided or distributed via a network such as the Internet. The computer program may also be provided as being stored in advance in ROM or the like.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processor comprising:
   a touch area sensor configured to detect a touch area of a finger that touches a touch panel of a display device;
   a direction sensor configured to detect a direction toward which the finger points; and
   a display controller configured to provide a pop-up display on the display device at a position on at least one first straight line substantially perpendicular to a second straight line, the second straight line passing on the touch area of the finger and being substantially parallel to the direction toward which the finger points, the position being separated from a cross point at which the second straight line substantially parallel to the direction toward which the finger points and the at least one first straight line cross each other by a predetermined distance, wherein the display controller is configured to provide the pop-up display on the display device based on the direction toward which the finger points detected by the direction sensor.

2. The information processor of claim 1, wherein the display controller is further configured to provide pop-up displays on both a left side and a right side with respect to the direction toward which the finger points, respectively.

3. The information processor of claim 2, wherein, the first straight line comprises one first straight line, and the display controller is further configured to provide two pop-up displays on the first straight line.

4. The information processor of claim 2, wherein, the first straight line comprises two first straight lines, and the display controller is further configured to provide four pop-up displays in total on the two first straight lines.

5. The information processor of claim 1, wherein the display controller is further configured to provide the pop-up display on either a left side or a right side with respect to the direction toward which the finger points.

6. The information processor of claim 5, further comprising an area comparator configured to compare display areas on the left side and the right side of the second straight line substantially parallel to the direction toward which the finger points, wherein the display controller is further configured to provide the pop-up display in one of the display areas that is greater in area than the other.

7. The information processor of claim 1, wherein the display controller is further configured to provide a pop-up display of a menu, a plurality of options being selectable from the menu by selection operation.

8. An information processing method comprising:
   detecting, by a touch area sensor, a touch area of a finger that touches a touch panel of a display device;
   detecting, by a direction sensor, a direction toward which the finger points; and
   providing, by a display controller, a pop-up display on the display device at a position on at least one first straight line substantially perpendicular to a second straight line, the second straight line passing on the touch area of the finger and being substantially parallel to the direction toward which the finger points, the position being separated from a cross point at which the second straight line substantially parallel to the direction toward which the finger points and the at least one first straight line cross each other by a predetermined distance, wherein the providing provides the pop-up display on the display device based on the direction toward which the finger points detected by the detecting by the direction sensor.

9. The information processing method of claim 8, further comprising, providing, by the display controller, pop-up displays on both a left side and a right side with respect to the direction toward which the finger points, respectively.

10. The information processing method of claim 9, wherein
    the first straight line comprises one first straight line, and
    the method further comprising, providing, by the display controller, two pop-up displays on the first straight line.

11. The information processing method of claim 9, wherein
    the first straight line comprises two first straight lines, and
    the method further comprising, providing, by the display controller, four pop-up displays in total on the two first straight lines.

12. The information processing method of claim 8, further comprising, providing, by the display controller, the pop-up display on either a left side or a right side with respect to the direction toward which the finger points.

13. The information processing method of claim 12, further comprising comparing, by an area comparator, display areas on the left side and the right side of the second straight line substantially parallel to the direction toward which the finger points, and providing, by the display controller, the pop-up display in one of the display areas that is greater in area than the other.

14. The information processing method of claim 8, further comprising providing, by the display controller, a pop-up display of a menu, a plurality of options being selectable from the menu by selection operation.

15. A computer program product comprising a non-transitory computer-readable storage medium having computer readable program code embodied in the medium that, when executed, causes a computer to perform the following steps:
detecting, by a touch area sensor, a touch area of a finger that touches a touch panel of a display device;
detecting, by a direction sensor, a direction toward which the finger points; and
providing, by a display controller, a pop-up display on the display device at a position on at least one first straight line substantially perpendicular to a second straight line, the second straight line passing on the touch area of the finger and being substantially parallel to the direction toward which the finger points, the position being separated from a cross point at which the second straight line substantially parallel to the direction toward which the finger points and the at least one first straight line cross each other by a predetermined distance, wherein the providing provides the pop-up display on the display device based on the direction toward which the finger points detected by the detecting by the direction sensor.

16. The computer program product of claim 15, further configured to cause a computer to perform the step of: providing, by the display controller, pop-up displays on both a left side and a right side with respect to the direction toward which the finger points, respectively.

17. The information processing method of claim 16, wherein
the first straight line comprises one first straight line, and
the computer program product further configured to cause a computer to perform the step of: providing, by the display controller, two pop-up displays on the first straight line.

18. The information processing method of claim 16, wherein
the first straight line comprises two first straight lines, and
the computer program product further configured to cause a computer to perform the step of: providing, by the display controller, four pop-up displays in total on the two first straight lines.

19. The information processing method of claim 15, further configured to cause a computer to perform the step of: providing, by the display controller, the pop-up display on either a left side or a right side with respect to the direction toward which the finger points.

20. The information processing method of claim 19, further configured to cause a computer to perform the steps of: comparing, by an area comparator, display areas on the left side and the right side of the second straight line substantially parallel to the direction toward which the finger points, and providing, by the display controller, the pop-up display in one of the display areas that is greater in area than the other.

* * * * *